(12) United States Patent
Klein et al.

(10) Patent No.: US 10,272,368 B2
(45) Date of Patent: Apr. 30, 2019

(54) FILTER ELEMENT AND FILTER ARRANGEMENT

(71) Applicant: MANN+HUMMEL GMBH, Ludwigsburg (DE)

(72) Inventors: Martin Klein, Ludwigsburg (DE); Frank Bartel, Dingolfing (DE); Jobst Eisengraeber-Pabst, Oberstenfeld (DE); Anton Kreiner, Reisbach (DE); Pamela Gohl, Remseck (DE); Lars Spelter, Ditzingen (DE); Armando Labarta, Ludwigsburg (DE); Michael Fasold, Auenwald (DE); Ulrich Dehnen, Kornwestheim (DE); Christopher Marc Sturgess, Korntal (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 47 days.

(21) Appl. No.: 15/351,925

(22) Filed: Nov. 15, 2016

(65) Prior Publication Data
US 2017/0056792 A1 Mar. 2, 2017

Related U.S. Application Data

(63) Continuation of application No. PCT/EP2015/061265, filed on May 21, 2015.

(30) Foreign Application Priority Data

May 21, 2014 (DE) ........................ 10 2014 007 374

(51) Int. Cl.
*B01D 29/07* (2006.01)
*B01D 35/147* (2006.01)

(52) U.S. Cl.
CPC ........... *B01D 29/071* (2013.01); *B01D 29/07* (2013.01); *B01D 35/147* (2013.01);
(Continued)

(58) Field of Classification Search
CPC .... B01D 29/071; B01D 35/147; B01D 29/07; B01D 2201/0415; B01D 2201/296; B01D 2201/122; B01D 2201/0423
(Continued)

(56) References Cited

U.S. PATENT DOCUMENTS 4,154,688 A 5/1979 Pall
6,382,190 B1 * 5/2002 Tanabe ................. B01D 29/071
123/509
(Continued)

FOREIGN PATENT DOCUMENTS

DE 19856723 A1 6/2000
DE 202009000969 U1 7/2010

*Primary Examiner* — Madeline Gonzalez
(74) *Attorney, Agent, or Firm* — James Hasselbeck

(57) ABSTRACT

A filter element for filtering liquids has a folded filter medium with outer fold edges and inner fold edges, wherein the inner and outer fold edges extend along a longitudinal axis of the filter element. A support body is provided with a first support body section and a second support body section, wherein the first support body section is facing the inner fold edges and hugs closely an envelope of the inner fold edges. An envelope of the outer fold edges and the second support body section hug closely at least sectionwise an outer circumferential surface of the filter element.

21 Claims, 7 Drawing Sheets

(52) U.S. Cl.
CPC ............ *B01D 2201/0415* (2013.01); *B01D 2201/0423* (2013.01); *B01D 2201/122* (2013.01); *B01D 2201/296* (2013.01)

(58) Field of Classification Search
USPC .......................................... 210/493.1, 493.5
See application file for complete search history.

(56) References Cited

U.S. PATENT DOCUMENTS

| | | | | |
|---|---|---|---|---|
| 2007/0114169 | A1* | 5/2007 | Suzuki ................. | B01D 29/012 210/441 |
| 2009/0020472 | A1* | 1/2009 | Lucas ................... | B01D 29/21 210/458 |
| 2013/0306531 | A1* | 11/2013 | Girondi ............... | B01D 35/147 210/130 |

* cited by examiner

FILTER ELEMENT AND FILTER ARRANGEMENT

CROSS-REFERENCE TO RELATED APPLICATIONS

This application is a continuation application of international application No. PCT/EP2015/061265 having an international filing date of 21 May 2015 and designating the United States, the international application claiming a priority date of 21 May 2014, based on prior filed German patent application No. 10 2014 007 374.2, the entire contents of the aforesaid international application and the aforesaid German patent application being incorporated herein by reference.

BACKGROUND OF THE INVENTION

The present invention concerns a filter element as well as a filter arrangement for filtering fluids such as, for example, liquid operating media for motor vehicles. A filter element is received in a filter receptacle or a filter housing so that, as a whole, a filter system or a filter arrangement is provided.

In the automotive field, liquid operating media are often employed, such as, for example, fuels like gasoline and diesel, lubricants like oil, or also urea solutions, and contaminants must be removed from them. For this purpose, usually filter elements are employed that are inserted into a filter housing or a filter receptacle. The filter elements themselves comprise in this context mostly a flat and folded filter medium which is provided between end disks or end caps and is radially flowed through. Known are in particular cylindrical housing and filter element geometries. Mostly, as a result of the installation situations, geometric specifications must be met by the respective filter element, the filter receptacle, and the supply and discharge lines for clean and raw fluid. It is desirable to employ in a small installation space a filter surface area as large as possible.

DE 198 56 723 A1 discloses a filter insert for a fuel filter comprising an inlet and an outlet wherein the filter insert comprises a filter material bellows that, in cross-section, is C-shaped and folded in a star shape and which is sealed on all sides by two flat end face covers in the form of circular sectors and by a rectangular lateral cover. The filter insert can be arranged in a space-saving way in a housing with a D-shaped cross-section.

The publication DE 20 2009 000 969 U1 discloses a filter element with a ring-shaped closed folded filter medium whose end faces are connected seal-tightly with end disks. The fold height between neighboring folds increases or decreases across several folds. In this way, the filter element can be integrated into installation spaces with special geometries.

WO 2007/081425 A1 describes filter elements with folded filter media wherein the folds extend along a longitudinal axis and a transverse axis extending transverse thereto between first and second fold tips. The fold depth varies along an axis which is normal to the fold planes.

SUMMARY OF THE INVENTION

It is therefore an object of the present invention to provide alternative or improved filter elements and/or filter arrangements.

Accordingly, a filter element for filtering liquids, in particular operating media for a motor vehicle, comprising a folded filter medium which comprises outer fold edges and inner fold edges is proposed. The fold edges extend in this context in particular along a longitudinal axis of the filter element, and a support body which comprises a first support body section and a second support body section is provided. The first support body section is facing the inner fold edges and hugs closely an envelope of the inner fold edges, and an envelope of the outer fold edges and the second support body section hug closely at least sectionwise an outer circumferential surface of the filter element.

The support body has the function of supporting the folds of the filter medium against the pressure of the liquid to be filtered and of protecting it from collapsing. Preferably, the inner fold edges are contacting the first support body section. For this purpose, the envelope of the inner fold edges and the contour of the first support body section are matched to each other so that an envelope of the inner fold edges and the first support section hug each other closely.

Due to the arrangement of the support body and of the folded or pleated filter medium in the proposed way, a particularly efficient and thus enlarged filter surface area can be achieved for a predetermined basic surface of the filter element. The filter element can comprise in this context an individual folded bellows of folded filter medium. Since an outer circumferential surface, i.e., a surface which outwardly delimits the filter element which is, for example, cylindrically shaped, is directly delimited by the outer fold edges as well as by a support body section, a beneficial distribution of the filter medium on the existing volume is possible. The filter medium is folded in this context in such a way that the fold sections extending between an inner fold edge and an outer fold edge extend parallel, or at least substantially parallel, to each other. In this context, the fold sections are located in planes that are parallel to each other and whose surface normal is oriented perpendicular to the longitudinal axis of the filter element.

The support body can advantageously be manufactured as a monolithic part of plastic material, for example, by an injection molding process.

In embodiments, the envelope of the outer fold edges and the second support body section form the outer circumferential surface of the filter element. The base surfaces of the filter element can be formed, for example, by the fold profiles.

In further embodiments of the filter element, the folded filter medium is embodied like an endless folded bellows and comprises a circumferential fold section. The circumferential fold section surrounds, in particular together with the inner fold edges, the support body. The support body can thus be introduced into the filter element. In this context, for example, the envelope of the outer fold edges together with the circumferential section, which hugs closely the second support body section, forms the outer circumferential surface of the filter element. The outer circumferential surface can be in particular a lateral cylinder surface, for example, of a circular cylinder, so that one can speak of a round filter element. In contrast to round filter elements that are conventional in the prior art, the folded filter medium is however not embodied as a star-shaped filter bellows but as a filter medium body with parallel fold position.

In embodiments of the filter element, the inner fold edges and the first support body section form at least partially a clean fluid area or clean liquid area. The clean liquid area can be positioned in this context at least partially within an envelope that is formed by the inner fold edges. Filtered fluid, for example, an operating medium for a motor vehicle, can flow out through the clean liquid area, in particular axially. The clean liquid area is provided, for example, within the support body between the first support body section and the second support body section.

In embodiments, flow of the liquid to be filtered is realized from the outer fold edges toward the second support body section. It can be said that in the filter element flow does not take place radially but at least partially transverse to the filter element cross-section, i.e., from the outer fold edges toward the inner fold edges and farther into the clean fluid area.

The outer circumferential surface can form in this context a lateral cylinder surface such as, for example, a circular lateral cylinder surface. However, also oval or angular lateral cylinder surfaces are conceivable.

In embodiments, the clean liquid area is eccentric to a centroid of the cross-sectional surface area of the lateral cylinder surface. In embodiments in which the filter element describes a round filter element of the kind of a circular cylinder surface, the clean liquid area is in particular outside of an area of the symmetry axis, i.e., the longitudinal axis.

In the filter element, fold sections with variable fold height can be formed between the outer and the inner fold edges. A variable fold height enables a particularly beneficial space utilization within the volume of the filter element, i.e., within the circumferential surface.

In embodiments, the first support body section is formed by support elements that are extending away from the second support body section. The support elements can be designed in this context in a rib shape or can be projecting parts.

In embodiments, the second support body section is liquid-tight. In a liquid-tight configuration, the second support body section can form an outer circumferential surface of the filter element. It is also conceivable that the second support body section comprises liquid passages.

In embodiments, end folds of the folded filter medium are fastened to the support body in an area between the first and the second support body sections.

In embodiments, the filter element comprises exclusively a continuous folded bellows that is formed by the folded filter medium. In comparison to other filter elements, the embodiment with only one filter bellows has the advantage that the filter surface area is increased. For example, a particularly beneficial space utilization within the circumferential surface of the filter element is realized.

In embodiments, moreover at least one end disk is provided which is attached to one of the fold profiles and which in particular comprises a connecting socket which is coupled in communication with the clean fluid area. The end disk can be applied to the fold profiles and stabilizes the fold geometry. In embodiments, an upper and a lower end disk are provided between which the folded filter medium as well as the support body are provided.

Advantageously, a bypass valve for the filter medium is integrated in the upper end disk or an upper end face of the support body. Such bypass valves are in particular used in oil filters. Due to the arrangement of the bypass valve in the upper area of the filter element, it is prevented that particles, which during operation deposit on the bottom of the filter element and/or filter housing, can pass through the bypass valve into the clean fluid area when the bypass valve is open. The bypass valve is preferably arranged adjacent to the connecting socket by means of which the clean fluid can be discharged from the filter element. The arrangement of bypass valve and connecting socket immediately adjacent to each other is advantageous for the differential pressure of the filter element or filter system. The bypass valve can be embodied, for example, as an adjustment valve or ball valve;

however, other embodiments are likewise possible. The upper end disk or the upper side surface of the support body can form the valve seat in this context so that an additional component forming the valve seat is not required.

In an advantageous embodiment of the filter element, the support body comprises a heating device. In this way, the filter element can be provided in a particularly space-saving way with a heating device. In particular in the configuration of the filter element as a fuel filter, a heating device is advantageous because the filter element can be heated with it, as needed, and the flow through the filter element is thus ensured even at low temperatures at which in particular components of diesel fuel have the tendency to solidify. With the heating function, the support body takes on a further function in addition to supporting the filter medium and guiding the clean fluid.

The heating device is advantageously designed as a foil composite, i.e., the heating device comprises a heating foil, for example, with an electrical resistance heating device which can be laminated between two carrier foils. The shape of the foil composite is adaptable to the support body and can be applied thereto. In this way, a relatively large surface area can be heated without causing a significant differential pressure increase.

The heating device can be applied, for example, to the second support body section. Alternatively, a shape of the heating device that is adapted to the complete support body is possible so that the heating device surrounds the support body like a jacket wherein expediently openings are introduced for passage of fluid through the heating device into a clean fluid area between first and second support body sections. A further alternative embodiment resides in that the support body and the heating device are formed together so that the heating device is non-separably connected to the support body. For example, the support body is produced as an injection-molded plastic part and the heating element is embedded by injection molding in the plastic material. A particularly advantageous embodiment of a heating device is described, for example, in the not yet published German patent application with the serial number DE 10 2015 003 098.1, reference being had thereto. Accordingly, a sandwich construction with an electrical resistance element that is laminated, for example, between two carrier foils and is framed by flat heat conducting elements is embedded in a plastic material. The electrical connecting contacts are extending out of the plastic material. Advantageously, such a sandwich structure is embedded in the plastic material of the support body.

In a further embodiment of the filter element according to the invention, the support body comprises at least one sensor or at least one interface for a sensor. The sensor is preferably arranged at the clean side. The interface is introduced, for example, in the form of a connecting socket into the second support body section so that the sensor can be inserted from the exterior into the filter element and projects into the clean fluid area between first and second support body sections. Also possible is a configuration of the sensor as a chip which can be arranged on an inner surface of the support body which is facing the clean fluid area. The chip can advantageously communicate contactless with a control/evaluation unit in the filter housing. The sensor can be, for example, designed to determine the temperature, the pressure, a pressure differential or a water level or to detect certain particles and/or their properties. The integration of the sensor into the support body enables a space-saving arrangement of the sensor.

A filter arrangement is further proposed which comprises a filter receptacle and a filter element received in the filter receptacle. The filter element is in particular designed as described above. In this context, for example, a connecting socket outside of the centroid of a cross-sectional surface area of the filter element can be provided. As a result of the arrangement of folded filter medium and the support body section adjacent to each other a predetermined installation space can be utilized beneficially.

Further possible implementations of the invention comprise also combinations, not explicitly mentioned, of features or configurations described above or in the following with regard to embodiments. In this context, a person of skill in the art will also add individual aspects as improvements or supplements to the respective basic form of the filter element and/or the filter arrangement.

Further configurations of the invention are subject matter of the dependent claims as well as of the embodiments of the invention described in the following. In the following, the invention will be explained in more detail with the aid of embodiments with reference to the attached figures.

BRIEF DESCRIPTION OF THE DRAWINGS

In the Figures, same reference characters identify same or functionally the same elements as long as nothing to the contrary is indicated.

DESCRIPTION OF PREFERRED EMBODIMENTS

Figure 1:
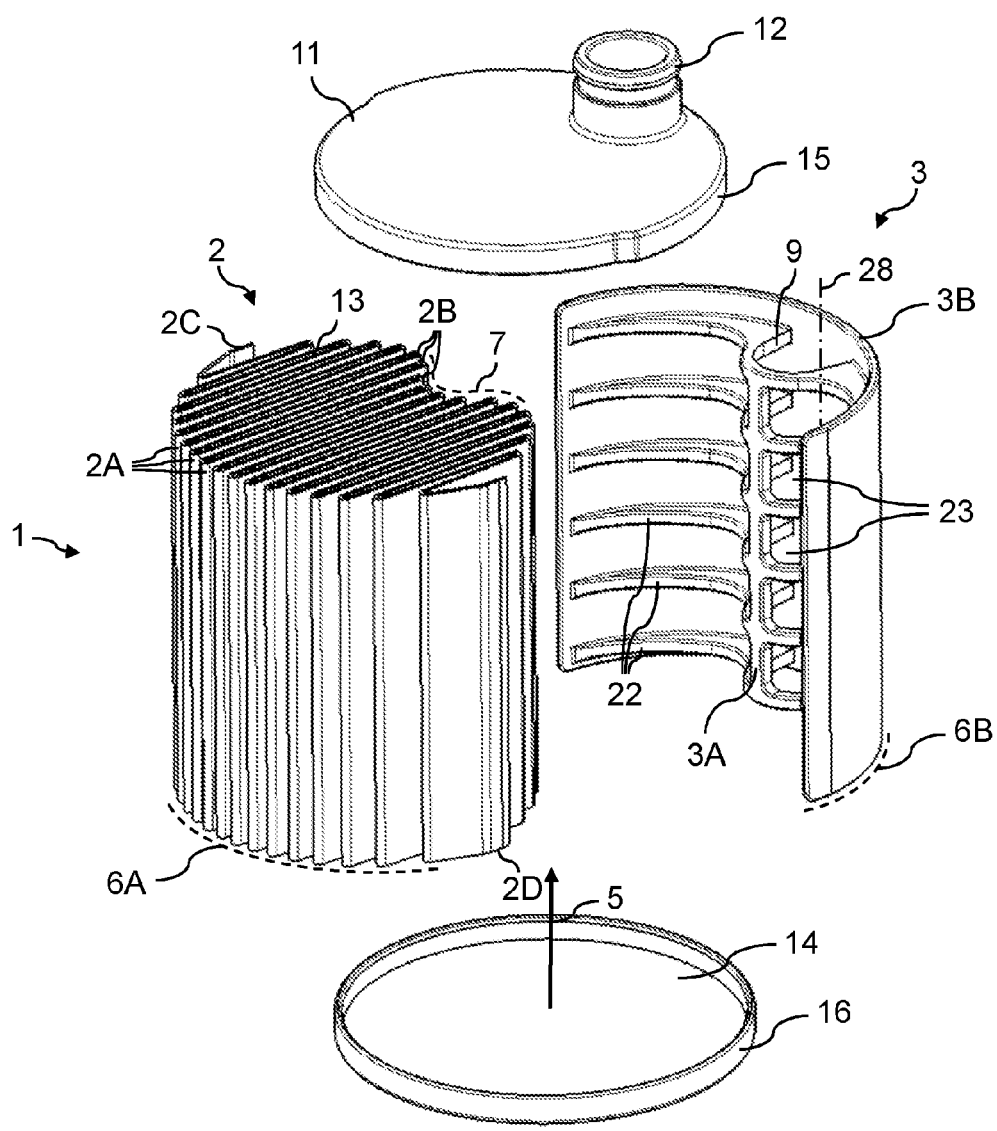
FIG. 1 shows a perspective exploded illustration of a first embodiment of a filter element.
Figure 2:
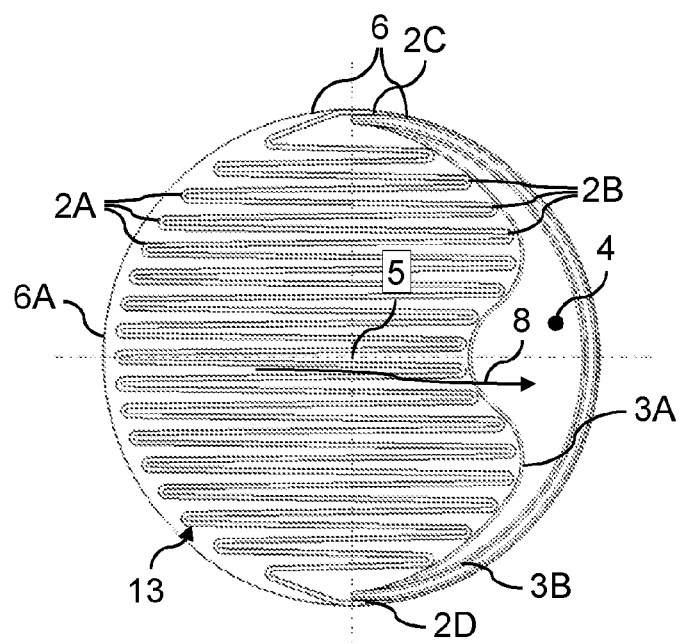
FIG. 2 shows a cross-sectional view of the filter element according to FIG. 1.

FIG. 1 shows a perspective exploded illustration of a first embodiment of a filter element. In FIG. 2 a corresponding cross-sectional view is illustrated. The first embodiment of a filter element 1 comprises in this context a folded filter medium 2 which is folded in a zigzag shape from a flat material. The material can comprise, for example, a synthetic nonwoven, paper, laid material or woven material. Flat filter media that are suitable for configuring pleated media are known. It is possible to employ single-layer or multi-layer media.

In the orientation of FIG. 1, one can see from above the fold profiles 13. In FIG. 2, one can see that the folds have different fold heights. This means that the spacing between neighboring fold edges 2A, 2B, between which a fold section is formed, changes across the course of the folds. The filter medium 2 forms a kind of folded bellows wherein the fold sections are substantially extending close to each other but fluid can still flow between the fold sections. The fold sections extend substantially parallel to each other, i.e., the fold sections extend in parallel planes. In the illustration one can see outer fold edges 2A and inner fold edges 2B wherein only some are identified in an exemplary fashion with reference characters. Outer fold edges 2A point outwardly and inner fold edges 2B point into the interior of the filter element 1.

Furthermore, in FIG. 1 an envelope 6A of the outer fold edges 2A is indicated as well as an envelope 7 of the inner fold edges 2B. Opposite the inner fold edges 2B, a first support body section 3A of a support body 3 is arranged. The support body 3 comprises substantially an outer or second support body section 3B and an inner support body section 3A which is formed by ribs 22 or support elements 9 extending away from the outer support body section 3B. The support elements 9 enclose in the assembled state a clean liquid area 4 and the ribs 22, which are spaced apart from each other in longitudinal direction 5, secure the shape in particular of the inner fold edges 2B of the filter medium 2. This means that in case of a flow direction 8 indicated in FIG. 2 the ribs 22 or the inner or first support body section 3A counteract deformation of the folds.

One can see in particular in FIG. 2 that the outer fold edges 2A together with the second support body section 3B form an outer circumferential surface of the filter element 1. The outer circumferential surface is identified by 6 and corresponds in the embodiment of FIG. 1 to a lateral cylinder surface. In operation of the filter element 1, contaminated fluid flows in the orientation of FIG. 2 from the left through the filter element 2 and passes along the flow direction 8 into the clean fluid area or clean liquid area 4. From here it can be used as purified operating medium in the motor vehicle. For example, the fluid can be oil or fuel.

The filter element 1 is also suitable in particular as a diesel or gasoline filter element but other application scenarios are also possible. For example, urea solution can be purified also by means of the filter element 1. As indicated in FIG. 2, the flow direction 8 existing in proper use of the filter element 1 extends substantially from the outer fold edges 2A toward the inner fold edges 2B or in the direction toward the inner support body section 3A and father to the outer support body section 3B. The folded filter medium 2 has end folds 2C and 2D which are attached in the transition area between the first and the second support body sections 3A, 3B. In the embodiment of FIG. 1, the second outer support body section 3B which partially forms the circumferential surface of the filter element 1 is fluid-tightly configured.

Moreover, as illustrated in FIG. 1, an (optional) upper and a lower end disk 11, 14 are provided which are connected respectively to the fold profiles 13. The end disks 11, 14 can be comprised of plastic material which is fastened fluid-tightly on the fold profiles 13. This can be realized by gluing or fusing or other fastening possibilities. The end disks 11, 14 stabilize the folds and separate a raw fluid area from a clean fluid area. The upper end disk 11 illustrated in FIG. 1 has a connecting socket 12 which corresponds with the clean liquid chamber 4. In this context, the connecting socket 12, like the clean liquid chamber 4, is arranged eccentrically. A longitudinal axis 5 of the filter element is shown in FIG. 1.

In the embodiment of FIG. 1 and FIG. 2, the end disks 11, 14 are provided with projecting rims 15, 16 so that the outer fold edges 2A of the folded bellows 2 and the outer support body section 3B are enclosed. In the inner support body section 3A, openings 23 are moreover provided so that the purified fluid can penetrate as unhindered as possible into the clean fluid area 4. In the illustrated embodiment of the filter element 1, the fluid to be purified, such as a liquid operating medium, does not really flow radially, i.e., in the direction toward the symmetry axis, through the filter medium 2 but rather transverse along a preferred direction 8 from the raw fluid area to the left in the orientation of FIG. 2 into the clean fluid area 4.

Figure 3:
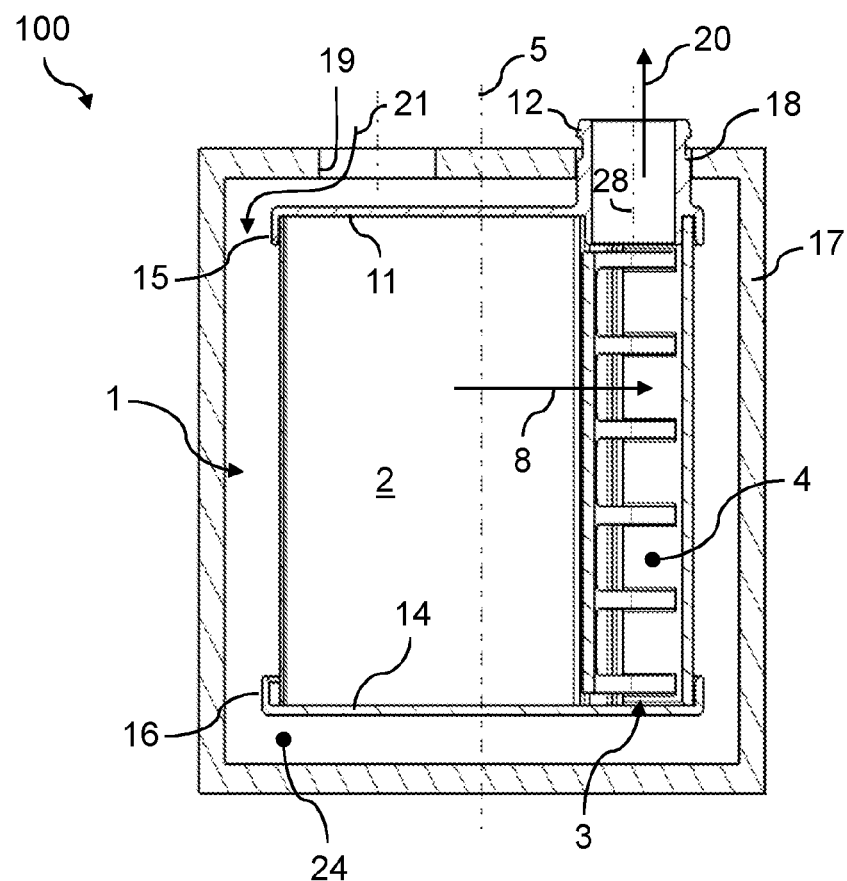
FIG. 3 shows a cross-sectional view of an embodiment of a filter arrangement with a filter element according to FIG. 1.

FIG. 3 shows a cross-sectional view of an embodiment of the filter arrangement with a filter element as illustrated in FIGS. 1 and 2. The filter arrangement 100 has in this context a filter receptacle or filter housing 17 with an inlet opening 19 for raw fluid and an outlet opening 18 for clean fluid. The filter element 1 is inserted into the filter receptacle 17 that is of a multi-part configuration. The connecting socket 12 is inserted into the outlet opening 18 in this context. Contaminated raw fluid 21 can enter the raw fluid area 24 through the inlet opening 19. The raw fluid area 24 surrounds the filter element 1. The filter element receptacle or the housing 17 can surround a cylinder-shaped volume. The fluid to be purified, for example, diesel fuel or the like, flows in flow direction 8 of the filter medium 2 and enters the clean fluid area 4 within the support body 3. From here, it flows through the connecting socket 12 as purified fluid 20 through further conduits, not illustrated, to further components of a motor vehicle.

Figure 4:
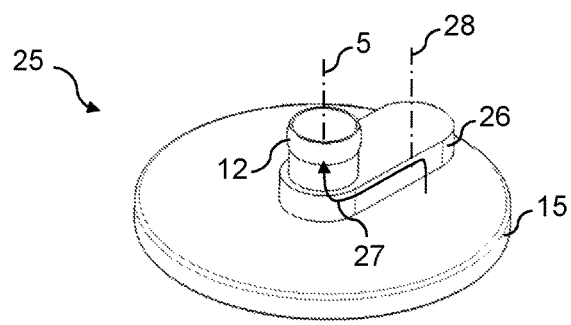
FIG. 4 is a perspective view of an embodiment of an end disk for a filter element.

In the embodiment as illustrated in FIG. 3, the clean fluid area 4 and thus also the respective connecting socket 12 or the outlet opening 18 of the housing 17 are arranged eccentric to the symmetry axis or longitudinal axis 5. However, a central outlet opening is desired in certain installation situations. In FIG. 4, a perspective view of another embodiment of an end disk for a filter element is illustrated which fulfills this requirement. The end disk 25 is embodied similar to the end disk illustrated in FIG. 1. However, a deflection channel 26 is provided which deflects clean fluid that is present substantially along the clean fluid area axis 28 in the direction toward the longitudinal axis or symmetry axis 5. The curved arrow 27 in FIG. 4 shows the flow of the clean fluid which is radially deflected. In this way, it is possible to provide the connecting socket 12 centrally on the end disk 25. In this respect, a filter element that is optimized with respect to the filter surface area can be used also in conventional filter arrangements which in general are designed for star-shaped endless folded bellows between two end disks and require a central connecting socket.

Figures 5, 6:
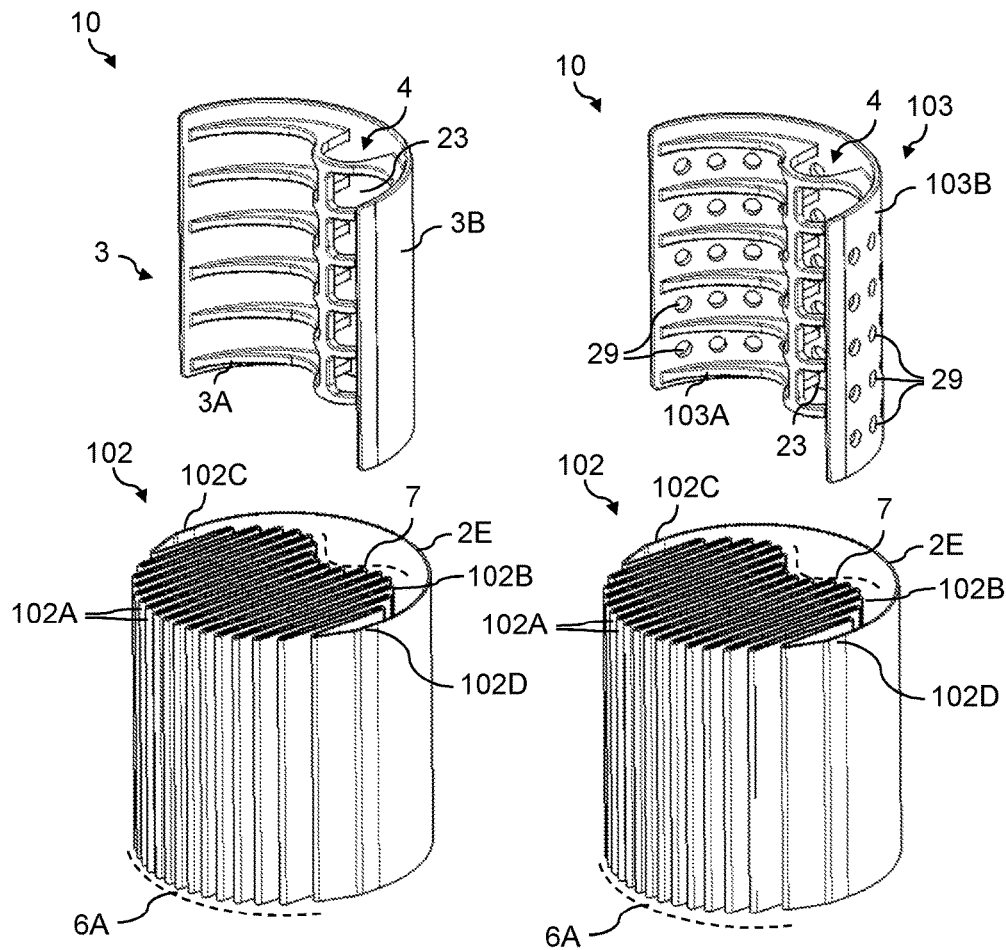
FIG. 5 is a perspective exploded illustration of a second embodiment of the filter element.
FIG. 6 is a perspective exploded illustration of a third embodiment of the filter element.

In FIGS. 5 and 6, perspective exploded illustrations of a second and a third embodiment of a filter element are illustrated. With regard to FIG. 5, a filter element 10 is illustrated in which the support body 3 is substantially designed in the way as explained with respect to the first embodiment of FIGS. 1 and 2. The filter medium 102 is designed as a modified endless folded bellows with varying fold height. The filter medium 102 has in this context a circumferential fold section 2E which surrounds the outer support body section 3B. One can see in FIG. 5 the outer fold edges 102A which form an envelope 6A.

Inner fold edges 102B have an envelope 7. The envelope 7 of the inner fold edges 102B surrounds together with the circumferential fold section 2E the clean fluid area 4 which is also delimited by the support body 3. In place of the end folds, identified in FIG. 2 as 2C and 2D, a circumferential fold section 2E is provided that connects the fold edges 102C and 102D and surrounds the support body 3. In this way, the circumferential surface is formed of the particularly long circumferential fold section 2E and the envelope 6A of the outer fold edges 102A.

FIG. 6 shows a filter element 10 which is designed similar to the filter element illustrated in FIG. 5. The filter medium 102 corresponds in this context to the endless folded bellows as indicated in FIG. 5. However, the support body 103 has an outer support body section 103B that is not fluid-tight. The support body section 103B has openings 29 through which the fluid can pass into the clean fluid area 4. Since the openings 29 in the assembled state are covered by the circumferential fold section 2E, further additional filter surface area is present. The second inner support body section 103A is facing the inner fold edges 102B of the folded bellows 102.

Fold courses may be provided that are deviating from the fold geometry as illustrated substantially in FIGS. 1 to 6. Accordingly, the geometry of the support body can also be adjusted. In FIGS. 7 to 10 cross-sectional views of further embodiments of filter elements are illustrated. In this context, the reference characters as in FIGS. 1 to 3 for the circumferential surface 6, outer fold edges 2A, inner fold edges 2B, clean fluid area 4, inner support body section 3A and outer support body section 3B are used. While in the embodiments of FIGS. 1 to 6 the inner fold edges 3A have an at least partially convex envelope, in FIGS. 7 to 10 concave envelopes 7 are indicated.

Figures 7, 8:
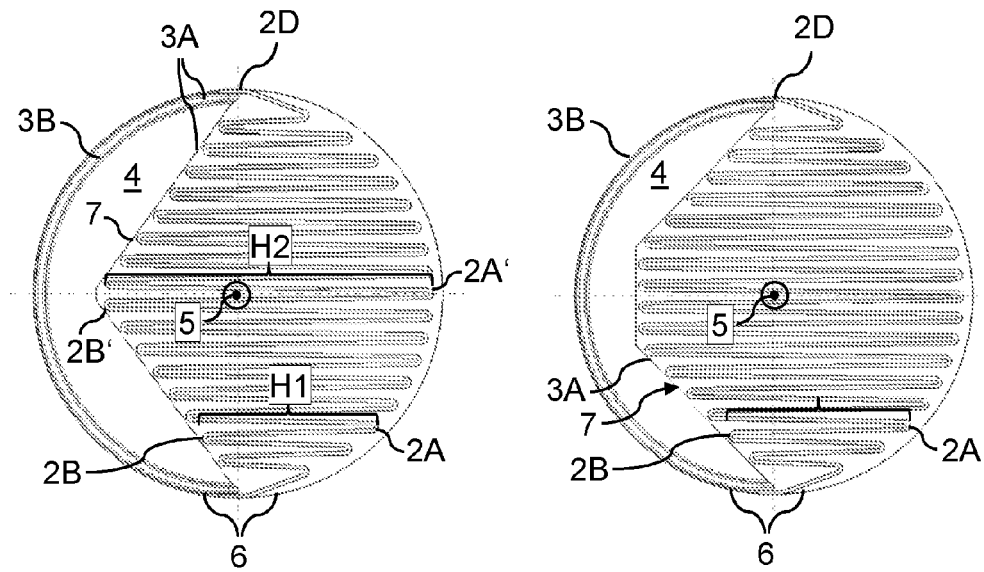
FIG. 7 is a cross-sectional view of a further embodiment of a filter element.
FIG. 8 is a cross-sectional view of a further embodiment of a filter element.

The example of FIG. 7 indicates how the fold height changes over the course of the fold bellows. Two neighboring fold edges 2A, 2B are explicitly referenced. The spacing between the outer fold edge 2A and the inner fold edge 2B defines substantially the fold height H1. Over the course of the folded bellows further neighboring fold edges 2A' and 2B' are indicated. The resulting fold height H2 is in this context significantly greater than the fold height H1. The filter element comprises thus a folded filter medium with variable fold height.

Figures 9, 10:
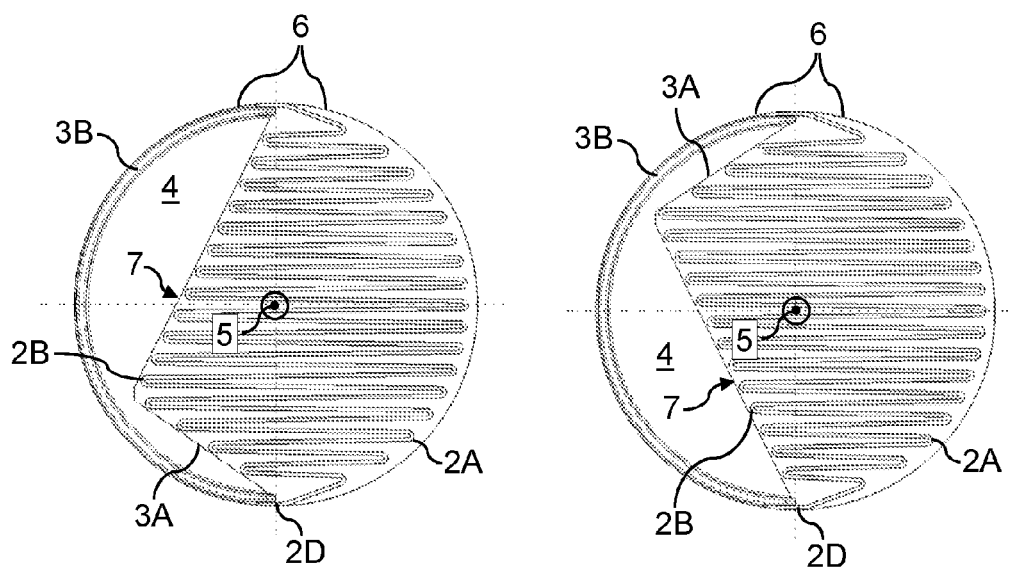
FIG. 9 is a cross-sectional view of a further embodiment of a filter element.
FIG. 10 is a cross-sectional view of a further embodiment of a filter element.

FIGS. 8, 9, and 10 show further geometric configurations of the fold heights and clean fluid area 4. Even though substantially circular cross-sectional surfaces areas are illustrated, other cylindrical shapes are also conceivable.

Figures 11, 12, 13:
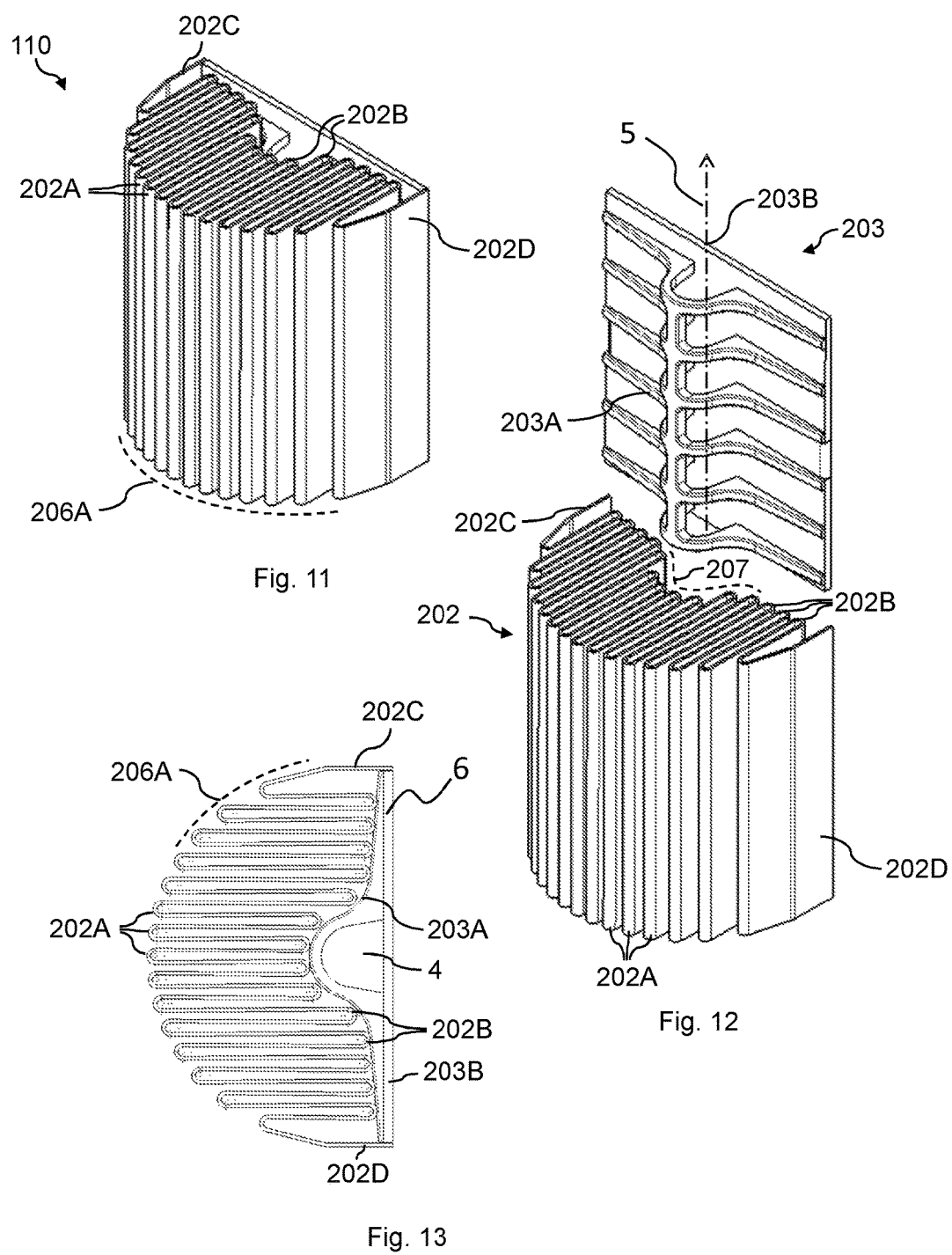
FIG. 11 is a perspective view of an eighth embodiment of a filter element.
FIG. 12 is an exploded view of the eighth embodiment.
FIG. 13 is a cross-sectional view of the eighth embodiment.

In FIGS. 11 to 13 an eighth embodiment of a filter element is illustrated. The filter element 110 has in this context, as can be seen in the cross-sectional view of FIG. 13, a semi-circular base surface. One can see also a zigzag-shaped folded filter medium 202 with variable fold height. In this context, outer fold edges 202A and inner fold edges 202B are formed. The respective end folds 202C and 202D are secured on the support body 203. The support body 203 has in this context a plate-shaped rectangular outer support body section 203B. From the support body section 203B, which is embodied as a plastic plate, ribs or support elements forming an inner support body section 203A project toward the inner fold edges 202B.

The filter element 110 has therefore a circumferential surface which is comprised of a rectangular section 203B and a semi-circular section which is formed of the envelope 206A of the outer fold edges 202A. One can see moreover the clean fluid area 4 which is enclosed by the plate 203B and the envelope or the inner fold edges 202b. Two identical filter elements 110 can be combined to a circular cylindrical element.

Figure 14:
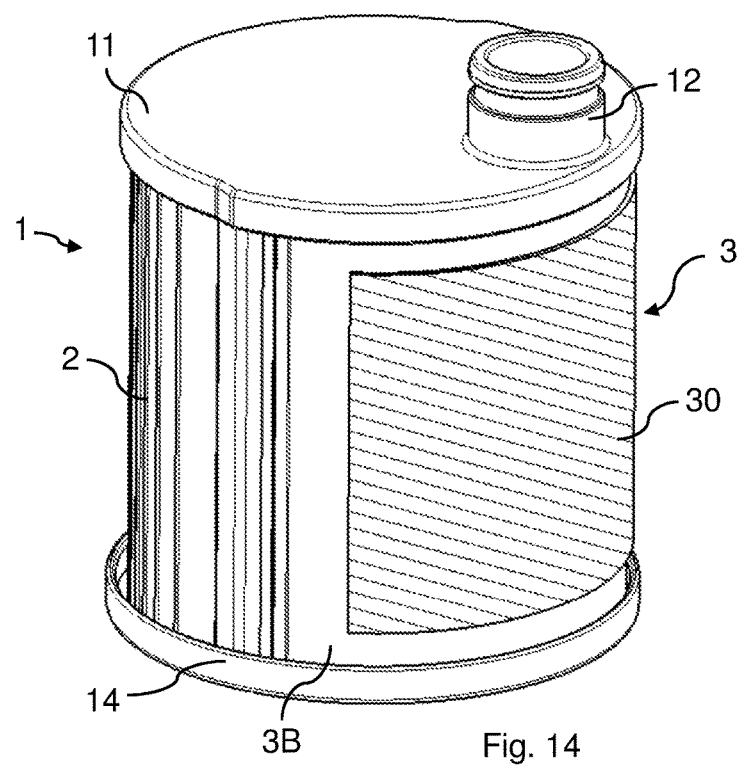
FIG. 14 is a perspective illustration of a support body of a filter element with integrated heating device.

In FIG. 14, an advantageous embodiment of a filter element 1 with an integrated heating device 30 is illustrated. The heating device 30 is in this context embodied as a foil composite and is applied to the second support body section 3B of the support body 3. In an alternative embodiment, not illustrated, the heating device is embedded in the material of the support body 3, for example, embedded in plastic material by injection molding.

Figures 15, 16:
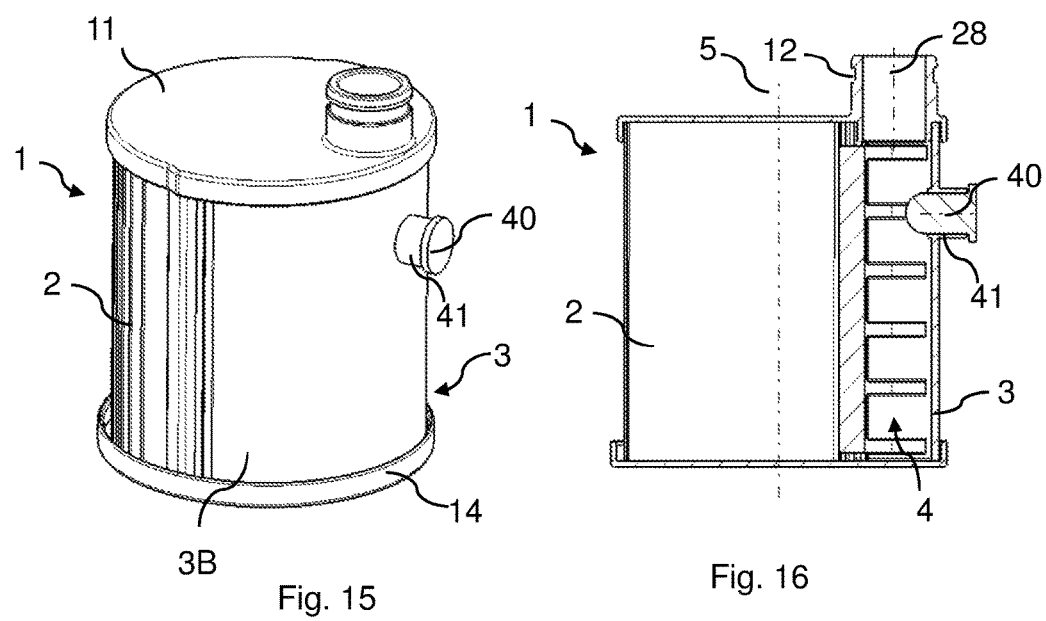
FIG. 15 is a perspective illustration of a filter element with a sensor.
FIG. 16 is a section illustration of the filter element with a sensor of FIG. 15.

In FIG. 15 and FIG. 16, an advantageous embodiment of a filter element 1 with a sensor 40 is illustrated. The support body 3 comprises an interface 41, for example, in the form of a threaded socket by means of which the sensor 40 can be connected to the support body 3. By means of the interface 41, the sensor 40 is insertable or introducible in such a way from the exterior into the second support body section 3B that the installed sensor 40 projects into the clean fluid area 4 behind the second support body section 3B. It is also conceivable to introduce several interfaces 41 into the support body 3 so that several sensors 40, in particular for different process parameters, can be connected to the support body 3.

Figure 17:
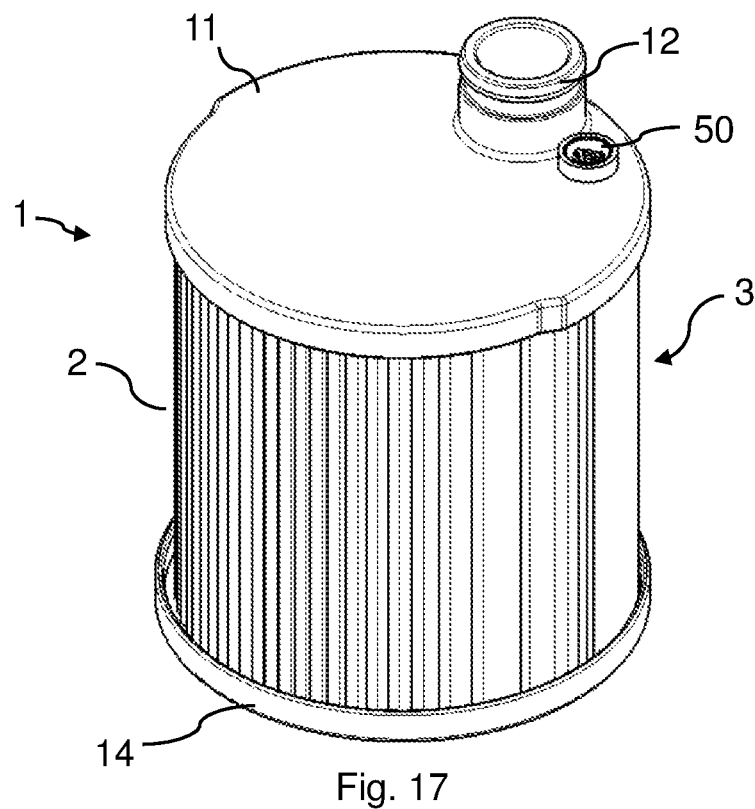
FIG. 17 is a perspective illustration of a filter element with filter bypass valve.

In FIG. 17, a filter element 1 is illustrated which is additionally provided with a bypass valve 50. The bypass valve 50 is integrated into the upper end disk 11 of the filter element 1 and is arranged eccentric to the longitudinal axis 5 of the filter element 1 and adjacent to the connecting socket 12 above the support body 3.

Figure 18:
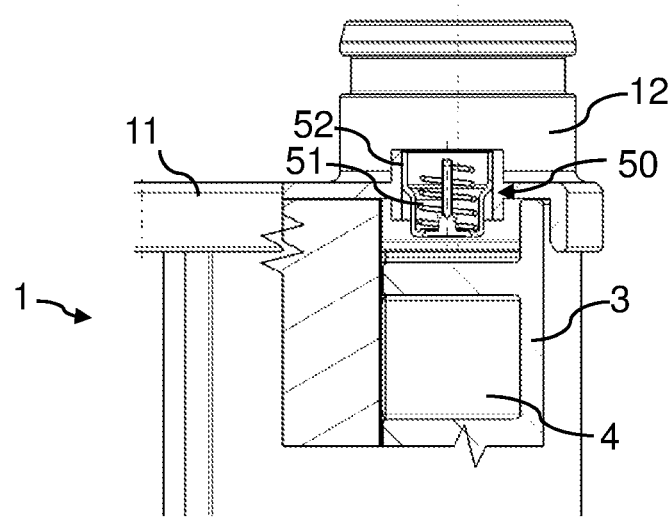
FIG. 18 is a section illustration of a detail of FIG. 17.

FIG. 18 shows in detail a portion of FIG. 17. The end disk 11 forms the valve seat of the bypass valve 50. The bypass valve 50 comprises a valve spring 51 and a valve cone 52. Other embodiments of the bypass valve 50 are however also possible.

Even though the present invention has been described in connection with various embodiments, it is not limited thereto but can be modified in many ways. The illustrated geometries can be changed. In addition to the indicated use for liquid filtration, gaseous fluids can be filtered also. In this respect, it is also possible to design the filter element as an air filter element.

While specific embodiments of the invention have been shown and described in detail to illustrate the inventive principles, it will be understood that the invention may be embodied otherwise without departing from such principles.

EMPLOYED REFERENCE CHARACTERS 1 filter element
2 filter medium
2A, 2B fold edge
2C, 2D end fold
2E circumferential fold section
3 support body
3A, 3B support body section
4 clean fluid area
5 longitudinal axis
6 circumferential surface
6A envelope of the inner fold edges
7 envelope of the outer fold edges
8 flow direction
9 support element
10 filter element
11 end disk
12 connecting socket
13 fold profile
14 end disk
15, 16 rim
17 filter receptacle
18 outlet opening
19 inlet opening
20 clean fluid
21 raw fluid
22 ribs
23 openings
24 raw fluid area
25 end disk
26 deflection channel
27 deflection flow
28 clean fluid area axis
29 openings
30 heating device
40 sensor
41 interface
50 bypass valve
51 valve spring
52 valve cone
102 filter medium
102A, 102B fold edge
102C, 102D end fold
103 support body
103A, 103B support body section
100 filter receptacle
110 filter element
202 filter medium
202A, 202B fold edge
202C, 202D end fold
203 support body
203A, 203B support body section
206A, 207 envelope
H1, H2 fold height

What is claimed is:

1. A filter element for filtering liquids, the filter element comprising:
a folded filter medium comprising a plurality of fold sections having outer fold edges and inner fold edges, the plurality of fold sections continuing side by side from a first fold section to a last fold section, wherein the inner and outer fold edges extend along a longitudinal axis of the filter element;
a support body comprising a first support body section and a second support body section, the first support body section arranged directly on an inner side of the second support body section and facing the inner fold edges, the first support body section projecting inwardly towards the inner fold edges;
wherein the first support body section is facing the inner fold edges and hugs closely an envelope of the inner fold edges, such that each of the plurality of fold sections are arranged at and to provide support against the first support body section;
wherein an envelope of the outer fold edges and the second support body section hug closely at least sectionwise an outer circumferential surface of the filter element;
wherein the plurality of fold sections each extend substantially parallel to each other.

2. The filter element according to claim 1, wherein
the envelope of the outer fold edges and the second support body section form the outer circumferential surface surrounding and closing about the filter element.

3. A filter element for filtering liquids, the filter element comprising:
a folded filter medium comprising a plurality of fold sections having outer fold edges and inner fold edges, the plurality of fold sections continuing from a first fold section to a last fold section, wherein the inner and outer fold edges extend along a longitudinal axis of the filter element;
a support body comprising a first support body section and a second support body section, the first support body section arranged directly on an inner side of the second support body section and facing the inner fold edges, the first support body section projecting inwardly towards the inner fold edges;
wherein the first support body section is facing the inner fold edges and hugs closely an envelope of the inner fold edges;
wherein an envelope of the outer fold edges and the first support body section hug closely at least sectionwise an outer circumferential surface of the filter element;
wherein the plurality of fold sections are arranged at a first side of the support body;
wherein the first fold section has a first fold end that extends about an opposite second side of the support body and connects directly onto a last fold end of the last fold section, such that the folded filter medium circumferentially closes about and circumferentially surrounds the support body.

4. The filter element according to claim 1, wherein
the inner fold edges and the first support body section form at least partially a clean liquid area.

5. The filter element according to claim 4, wherein
the clean liquid area is positioned at least partially within the envelope of the inner fold edges.

6. The filter element according to claim 1, wherein,
in proper use of the filter element, a flow direction of a liquid to be filtered by the filter element extends from the outer fold edges toward the second support body section.

7. The filter element according to claim 1, wherein
the outer circumferential surface forms a lateral cylinder surface.

8. The filter element according to claim 7, wherein
the lateral cylinder surface is a circular lateral cylinder surface.

9. The filter element according to claim 7, wherein
a clean liquid area of the filter element is arranged eccentric to a centroid of a cross-sectional surface area of the lateral cylinder surface.

10. The filter element according to claim 1, wherein
each of the plurality of fold sections has a fold height defined as a distance from the inner fold edge to the outer fold edge;
wherein the plurality of fold sections have varying fold heights.

11. The filter element according to claim 1, wherein the first support body section is formed by support ribs arranged on the inner side of the second support body and extending across multiple adjacently positioned inner fold edges of the plurality of fold sections.

12. The filter element according to claim 1, wherein
the second support body section is liquid-tight or comprises fluid passages.

13. The filter element according to claim 1, wherein
the folded filter medium comprises end folds and the end folds are fastened to opposite ends of the support body in an area between the first and the second support body sections.

14. The filter element according to claim 1, wherein
the folded filter medium is a continuous folded bellows.

15. The filter element according to claim 1, further comprising at least one end disk fastened on fold profiles of the folded filter medium and provided with a connecting socket that is in fluid communication with a clean liquid area of the filter element.

16. The filter element according to claim 1, further comprising
a bypass valve arranged at an upper end face of the filter element.

17. The filter element according to claim 16, wherein
the upper end face of the filter element comprises an upper end disk attached to upper fold profiles of the folded filter medium,
wherein the upper end disk forms a support for the bypass valve.

18. The filter element according to claim 16, wherein
the upper end face of the filter element comprises an upper end face of the support body and the upper end face of the support body forms a support for the bypass valve.

19. The filter element according to claim 1, wherein
the support body comprises a heating device.

20. The filter element according to claim 1, wherein
the support body comprises at least one sensor or at least one interface for a sensor.

21. A filter arrangement comprising a filter receptacle and a filter element according to claim 1 that is received in the filter receptacle.

* * * * *